Sept. 4, 1945.  S. G. ISSERSTEDT  2,384,380
CONTROL MECHANISM
Filed March 26, 1943
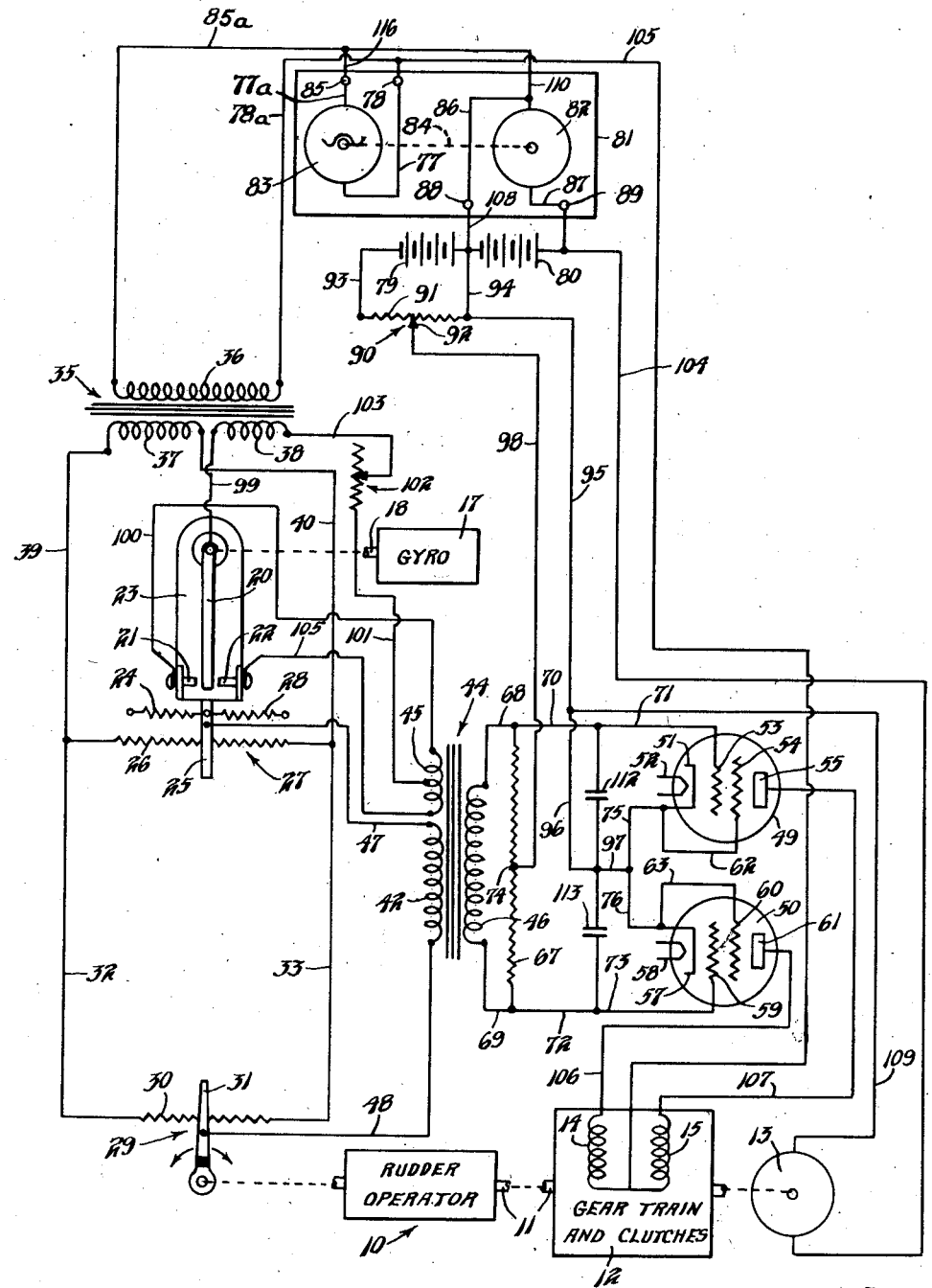
Inventor
SIEGFRIED G. ISSERSTEDT.
By
George N. Fisher
Attorney Patented Sept. 4, 1945

2,384,380

UNITED STATES PATENT OFFICE 2,384,380

CONTROL MECHANISM

Siegfried G. Isserstedt, Toronto, Ontario, Canada, assignor to Minneapolis-Honeywell Regulator Company, Minneapolis, Minn., a corporation of Delaware Application March 26, 1943, Serial No. 480,669

20 Claims. (Cl. 172—282)

The present invention is concerned with control mechanism and more particularly with flight control mechanism employing a novel motor control system.

An object of the present invention is to provide flight control mechanism in which a flight control surface is normally adjusted by an amount dependent upon the amount of deviation of a flight condition from the desired value and in which upon only a slight deviation of the condition from the desired value, the control surface is adjusted a fixed amount.

A further object of the present invention is to provide in connection with such flight control mechanism a novel motor control system of general application in which the motor is adjusted an amount dependent upon the value of the deviation of a controlling condition from a desired value if said deviation is substantial and in which said motor is adjusted by a fixed amount if the deviation is small.

A still further object of the present invention is to provide such a motor control system in which a main controller is connected through a lost motion connection to a control device by which the motor is normally variably positioned in accordance with the magnitude of the deviation and in which the main controller operates a further control device during the lost motion of the connection to effect small fixed movements of the motor.

A still further object of the present invention is to provide such a control system in which the movement of the motor for the fixed distance requires the exertion of only a very slight force by the controller.

A still further object of the invention is to provide a motor control system in which motor controlling mechanism is connected to the secondary of a transformer having a plurality of primaries, one of which primaries is energized in accordance with the output of an impedance bridge and the other of which primaries is energized under the control of an auxiliary control device.

Other objects of the invention will be apparent from a consideration of the accompanying specification, claims, and drawing of which the single figure is a schematic showing of my novel flight control system.

Referring to the drawing, the reference numeral 10 is employed to designate an operating mechanism for an airplane rudder. The details of this mechanism or of the rudder itself form no part of the present invention beyond the fact that the rudder operator 10 causes the rudder to assume any of a large number of predetermined positions depending upon the position assumed by a shaft 11 of the rudder operator. The shaft 11 is driven by a servomotor which comprises a normally constantly running motor unit 13 which is connected with an assembly 12 comprising a gear train and clutches for selectively driving the shaft 11 at a relatively low speed in either of two directions. The clutches are actuated by windings 14 and 15. If winding 14 is energized, one clutch is engaged to cause the shaft 11 to rotate in one direction at a relatively low speed. If the winding 15, on the other hand, is energized, a second clutch is engaged to cause the shaft 11 to rotate in the opposite direction. The details of this gear train and clutching mechanism have not been shown since they are entirely conventional in the art and form no part of the present invention.

The operation of motor 13 is controlled by a gyroscope 17. This gyroscope is of conventional construction and serves in the usual manner to indicate whenever the direction of the airplane deviates from that for which the gyroscope is set. A gyroscope shaft is indicated by the reference character 18. Upon such a deviation in the direction of flight of the aircraft, the shaft 18 is rotated in a direction corresponding to the direction of the deviation. Secured to the shaft 18 is a switch arm 20. This switch arm is designed to engage with either one of two opposed contacts 21 and 22 which are adjustably secured to a plate 23. The plate 23 is journalled concentrically with shaft 18 around any suitable supporting means and is biased to the center position by opposed springs 24 and 28. The plate 23 carries at its lower end a contact arm 25 adapted to slidably engage a resistance 26. The contact arm 25 and resistance 26 form a control potentiometer 27.

The contact arm 20 is relatively unimpeded in its movement so that only a very slight torque need by exerted by gyroscope 18 to move the switch arm 20 between its two contacts 21 and 22. It is not until switch arm 20 has engaged one of these two contacts that any movement is imparted to the contact arm 25. In other words, the contact arm 25 is connected to the gyroscope shaft 18 through a lost motion connection. Switch arm 20 must engage with either contact 21 or 22 before the lost motion of this connection terminates.

A follow-up potentiometer 29 comprises a resistor 30 and a contact arm 31. The contact arm 31 is secured to the shaft 11 and is hence caused to assume a position corresponding to the position of the rudder.

The control potentiometer 27 and the follow-up potentiometer 29 are connected together by conductors 32 and 33 to form an impedance bridge. Power is supplied to this bridge by a transformer 35. The transformer 35 comprises a high voltage primary winding 36 and a pair of low voltage secondary windings 37 and 38. The secondary winding 37 is connected by conductors 39 and 40 to the opposite ends of resistor 26 and through conductors 32 and 33 to the opposite ends of resistor 30. It will be readily apparent that the potentiometers 27 and 29 are connected so as to form an impedance bridge, the output terminals of which are constituted by contact arms 25 and 31.

The reference numeral 44 indicates a transformer having a primary winding 42, a center tapped primary winding 45 and a single secondary winding 46. The primary winding 42 is connected by conductors 47 and 48 to contact arms 25 and 31. It will be readily apparent that the output terminals of the bridge are connected to the primary winding 42 so that this winding has impressed across it the output voltage of the impedance bridge formed by potentiometers 27 and 29.

The switch blade 20 serves to control the connections of the secondary winding 38 to the primary winding 45. These connections under different conditions of operation will be described later.

The voltage across secondary winding 46 is employed to control the grid voltages of a pair of gas filled electronic discharge devices 49 and 50. These two devices are entirely conventional in construction. One particular type of discharge device which I prefer to employ is the electronic tube designated by the type No. 2050. Such a tube comprises an indirectly heated cathode, a control grid, a shield grid and an anode. Thus, referring to tube 49, this tube comprises a cathode 51 having a heater 52, a control grid 53, a shield grid 54 and an anode 55. Similarly, the tube 50 comprises a cathode 57, a filament 58, a control grid 59, a screen grid 60, and an anode 61. In each case, the various electrodes are enclosed within a gas filled envelope. In the present application of the device, I find it desirable to connect the shield grids of each tube to the cathode. The shield grid 54 is connected by conductor 62 to cathode 51 and the shield grid 60 by conductor 63 to cathode 57.

A resistor 67 is connected across secondary 46 by conductors 68 and 69. The voltage produced in secondary 46 by primary windings 42 and 45 is thus impressed across resistor 67. The upper terminal of resistor 67 is connected by conductors 70 and 71 to grid 53 of tube 49. The lower terminal of resistor 67 is connected by conductors 72 and 73 to grid 59. The resistor 67 is provided with a center tap 74. This center tap is connected to the junction of conductors 75 and 76 connected to cathodes 51 and 57, respectively. These connections will be traced later.

Power is supplied to the system by a pair of batteries 79 and 80. In one particular embodiment of my invention, these batteries are each 12 volt batteries so as jointly to form a 24 volt battery of the type commonly employed in aircraft. The battery 80 is employed in order to energize a voltage converter 81 such as a "Genemotor." This "Genemotor" comprises a direct current unit 82 and an alternating current unit 83. Actually, the units have a common armature and differ merely in the field windings. For convenience, they have been shown as though they were a separate motor 82 and generator 83, connected together by a shaft 84. The input opposite terminals of the motor 82 are connected by conductors 86 and 87 to terminals 88 and 89. Terminals 88 and 89 are in turn connected to opposite terminals of the battery 80. The motor 82 upon being energized by battery 80 serves to rotate the generator 83 at a predetermined speed to generate alternating current of the desired frequency. The opposite terminals of the generator 83 are connected by conductors 77 and 77a to terminals 78 and 85. The terminals 78 and 85 are connected through conductors 78a and 85a to the primary winding 36. Thus, the "Genemotor" serves to supply alternating power to the primary 36 of transformer 35. The output terminals 78 and 85 are also connected in the plate circuits of tubes 49 and 50 and these plate circuits will be traced later in connection with the operation.

A potentiometer 90 comprising a resistor 91 and a sliding contact 92 are connected by conductors 93 and 94 across battery 79. The potentiometer 90 functions as a voltage divider to impress between the right-hand end thereof and slider 92 an adjustable portion of the voltage existing across battery 79. As will be pointed out presently, this is employed to supply biasing voltage to the tubes 49 and 50.

The connections between the center tap 74 of resistor 67 and the junction of conductors 75 and 76 extending to cathodes 51 and 57 include a conductor 98, contact 92, the right-hand portion of resistor 91, and conductors 95, 96, and 97. It will be noted that inasmuch as the right-hand end of resistor 91 is connected to the positive terminal of the battery 79 and the left-hand end to the negative terminal of battery 79, the right-hand end of resistor 91 will be positive with respect to slider 92. Hence, by reason of the connections just recited, the center tap 74 will be maintained at a potential less than that of cathodes 51 and 57. In other words, the grids 53 and 59 will be biased negatively by the amount of the voltage existing between slider 92 and right-hand terminal of resistor 91. It will be recalled that grids 53 and 59 are connected to the opposite ends of resistor 67. Thus, the voltage existing between cathode 51 and grid 53 will include the biasing voltage introduced by potentiometer 90 and the voltage existing across the upper half of resistor 67. Similarly, the voltage between grid 59 and cathode 57 will include the voltage existing across the lower half of resistor 67 and the voltage across the right-hand portion of potentiometer 50.

A condenser 112 is connected between conductor 71 leading to grid 53 and conductor 97 connected to cathodes 51 and 57. A condenser 113 is connected between conductor 73 leading to grid 59 and conductor 97. Condensers 112 and 113, being connected across the grid circuits of tubes 49 and 50, serve to bypass any stray high frequency voltages that might otherwise be impressed between the grids and cathode.

*Operation*

The various elements are shown in the position assumed when the aircraft is following the course for which the gyroscope 17 is set. Under these conditions, the network consisting of potentiometers 27 and 29 is balanced so that no voltage is impressed upon primary winding 42 by this network. Similarly, the switch blade 20 is in engagement with neither contact 21 nor contact 22.

The motor unit 13 is energized by battery 80 through the following circuit: from the positive terminal of battery 80 through conductor 104, motor 13, and conductors 109 and 95 to the other terminal of resistor 91. Since, however, neither of the clutch windings 14 and 15 is engaged, shaft 11 will not be revolved.

Let it be assumed now, however, that the aircraft deviates from this course in such a manner as to cause the gyroscope shaft to rotate switch arm 20 in a clockwise direction. Such movement requires very little effort on the part of the gyroscope shaft 18 inasmuch as there is no resistance to movement of contact arm 20 other than that of inertia. Upon the contact arm 20 engaging contact 21, a circuit is established to the upper half of primary winding 45 as follows: from the left-hand terminal of primary 38 through conductor 99, contact arm 20, contact 21, conductor 100, the upper half of primary winding 45, conductor 101, rheostat 102, and conductor 103 to the other terminal of secondary 38. The result of the establishment of this circuit is that a substantial portion of the voltage of secondary winding 38 is impressed across the upper half of primary winding 45. The portion of the voltage of secondary 38 so impressed is determined by the setting of rheostat 102.

The energization of primary winding 45 causes a voltage to be impressed upon the secondary winding 46. The phase relation of this voltage with respect to the voltage applied to the anodes of tubes 49 and 50 is such that during the half cycle when anodes 55 and 61 are positive, the lower end of resistor 67 is positive with respect to the upper end. This results in the voltage of grid 59 being increased with respect to that of cathode 57 and that of grid 53 decreased with respect to cathode 51. The magnitude of the voltage so impressed upon resistor 67 is adjusted by rheostat 102 to be of such a value that the increase in potential of grid 59 raises the potential above the cut-off potential of tube 50. In other words, the potential of grid 59 is raised to the point such that the tube 50 is made conductive. When this happens, current flows through the clutch winding 14 as follows: from the output terminal 78 of "Genemotor" 81 through conductor 105, clutch operating winding 14, conductor 106, anode 61, cathode 57, and conductors 76, 97, 96, 95, 94, and 108, terminal 88, and conductors 86, 110, and 116 to the other output terminal 85 of an alternating current generator 83. As a result of the establishment of this circuit during each half cycle that anode 61 is positive with respect to cathode 51, current will flow in the direction traced through the winding 14. This causes one of the clutches to be engaged so as to cause motor unit 13 to drive shaft 11 in a counter-clockwise direction. Such counter-clockwise movement causes similar rotation of the rudder operator. Such movement of the rudder operator is designed to move the rudder in a direction to correct for the change in direction indicated by the gyroscope 17.

The counter-clockwise movement of shaft 11 produces a similar counter-clockwise movement of contact arm 31. When this happens, the contact arm 31 assumes a position to the left of contact 25. As a result of this, the resistance bridge is unbalanced so as to produce across winding 42 a voltage which is 180 degrees displaced in phase with respect to the voltage across the upper half of primary 45. This, in turn, will tend to introduce into secondary 46 a voltage counteracting the voltage introduced by the upper half of primary winding 45. When the movement of the shaft 11 and the rudder operator has proceeded to a desired point, the opposing voltage introduced by primary 42 will substantially overcome the voltage introduced by primary winding 45. As a result, the voltage across resistor 67 will be no longer sufficient to overcome the effect of the biasing voltage introduced by potentiometer 98. Hence, tube 50 will again become non-conductive and winding 14 will be deenergized. This will result in further rotation of the rudder operator being terminated.

As a result of the operation which has been described so far, the slight deviation of the aircraft from its course, as indicated by the gyroscope 17, results in a small movement of the rudder of predetermined magnitude. This small movement of the rudder will eventually cause the aircraft to return to its normal course so as to cause gyroscope shaft 18 to assume its normal neutral position. When the shaft does assume this position, the switch blade 20 will assume a neutral position in which it is disposed intermediate contacts 21 and 22. As soon as switch blade 20 separates from contact 21, the primary winding 45 will be completely deenergized so that the only voltage introduced in secondary 46 and hence impressed across resistor 67 is that introduced by the unbalance of the bridge. Since this latter voltage will now be unopposed by the primary winding 45, a potential will be induced in secondary 46, which potential is 180 degrees out of phase with that previously considered. As a result, the potential of grid 53 with respect to the cathode 51 will be increased and the potential of grid 59 with respect to the cathode 57 will be decreased. Since, the magnitude of this voltage was originally sufficient to raise the potential of grid 59 enough to overcome the biasing voltage, it will be obvious that the voltage of grid 53 will now be raised sufficiently to overcome the biasing voltage. As a result, the tube 49 will be rendered conductive and current will flow through the following circuit to winding 15: from terminal 78 through conductor 105, winding 15, conductor 107, anode 55, cathode 51, conductors 75, 97, 96, 95, 94, and 108, terminal 88, and conductors 86, 110, and 116 to the other terminal 85. As a result of the fact that the potential of grid 53 is above the cut-off potential, current will flow through the circuit just traced each time that anode 55 is positive with respect to cathode 51. The clutch winding 15 is accordingly energized. This causes rotation of shaft 11 in a clockwise direction, which is opposite to the direction previously considered. As a result, the rudder operator moves in the opposite direction to return the rudder to its center position. At the same time, the contact arm 31 moves to the right until its position corresponds to the position of contact arm 25. When the contact arm 31 reaches this position, the bridge will again be balanced so that tube 49 will cease to be conductive. The rudder will now again be in its center position. Under these conditions, the aircraft is again flying in the course for which the gyroscope is set and the elements have all returned to their neutral position.

Let it be assumed that the aircraft deviates slightly in the opposite direction from its course. Under these conditions, the switch blade 20 will be moved into engagement with contact 22. When this happens, a circuit will be established to the lower half of secondary winding 46 as follows: from the left-hand terminal of secondary 38 through conductor 99, switch blade 20, contact 22, conductor 105, the lower half of winding 45, conductor 101, rheostat 102, and conductor 103 to the other terminal of winding 38. The voltage impressed across the lower half of primary winding 45 is 180 degrees out of phase with respect to the voltage previously impressed across the upper half of winding 45. This is due to the fact that the lower terminal of winding 45 is now connected to the same point as that to which the upper terminal of winding 45 was previously connected. Hence, the voltage now induced in secondary 46 will be such that the potential of grid 53 tends to be raised with respect to the cathodes and that of grid 59 tends to be lowered. This increase in the potential of grid 53 will be sufficient to overcome the biasing voltage and to raise the potential of grid 53 above the cut-off potential. Consequently, current will now flow through the plate circuit of tube 49 previously traced, which plate circuit includes the winding 15. As a result, winding 15 will be energized to engage its associated clutch. When this happens, the motor 13 is effective to rotate shaft 11 in a clockwise direction. Such clockwise rotation of shaft 11 will cause the rudder 11 to be shifted and will cause contact arm 31 to be rotated in a clockwise direction. The movement of arm 31 in a clockwise direction tends to shift arm 31 to a position to the right of contact arm 25 and hence unbalance the bridge. The result of this is that a voltage is impressed on primary winding 42, which voltage is 180 degrees out of phase with that across the lower half of winding 45. When the desired movement of the rudder has taken place, the effects of the voltage across the lower half of primary winding 45 and that across winding 42 will nullify each other so that substantially no voltage is impressed across resistor 67. As a result, the voltage of grid 53 is no longer above the cut-off potential so that tube 49 becomes non-conductive. Thus, again the departure of the aircraft from its course has caused a predetermined change in the position of the rudder such as to cause the ship to resume its course. When the ship does resume its course, the gyroscope shaft 18 will return to a neutral position causing switch blade 20 to separate from contact 22. When this happens, the only voltage induced in secondary 46 will be that induced by the primary winding 42. Hence, tube 50 will become conductive so as to cause current to flow through winding 14. This will energize the other clutch so as to cause the rudder to be rotated in the opposite direction back to its neutral position and to cause contact arm 31 to move back toward its center position. When the desired movement of the rudder has taken place, contact arm 31 will again be in its mid position, in which position the bridge is balanced so that no voltage is impressed across primary winding 42 by the bridge.

In the operation which has been described so far, the deviations in the direction of flight of the aircraft have been extremely slight deviations. In fact, the magnitude of these deviations is so small as to be neglected in previous flight control systems. Let it be assumed now that the deviation in the direction of flight is more substantial. Consider first the case in which the deviation in direction of flight is such as to cause a counter-clockwise movement of switch blade 20. After the switch blade 20 has engaged the contact 21, further movement of switch blade 20 will rotate the entire plate 23 about its axis so as to cause movement of contact arm 25 to the left with respect to resistor 26. As a result of such movement, a voltage is not only impressed across the upper half of primary winding 45 by reason of the engagement of switch blade 20 with contact 21 in the manner previously described, but a voltage is also impressed across winding 42 by reason of the unbalance in the bridge. Furthermore, this voltage will be in phase with the voltage across the upper half of winding 45 so that the two primary windings 45 and 42 will aid each other in the voltage induced in winding 46. The position of rheostat 102 is preferably such that the combined voltage induced in secondary 46 by primary windings 45 and 42 is a function of the departure of switch arm 20 from its neutral position. Thus, the potential of grid 59 with respect to anode 63 is now again raised sufficiently to overcome the biasing voltage. Again, current will flow through the winding 14 and the plate circuit of tube 50 so as to cause the energization of winding 14. The shaft 11 will again be rotated in a counter-clockwise direction to move the rudder in a direction such as to cause the aircraft to resume the course for which the gyroscope is set. At the same time, the contact arm 31 is moved in a counter-clockwise direction, which is the same direction as the movement of contact 25 which caused the unbalance of the bridge. This movement of contact arm 31 will continue to the point where the bridge is unbalanced in the opposite direction sufficiently so that the effect of the balanced voltage impressed across primary winding 42 is sufficient to overcome the effect of the voltage across the upper half of the winding 45. In other words, this movement will continue until the voltage across secondary winding 46 is negligible. The movement of the rudder and of contact arm 31 necessary to produce this condition, however, is no longer merely a predetermined one but is a function of the extent of the movement of contact arm 25 from its neutral position. In other words, the new rudder position bears a definite relation to the amount of deviation of the aircraft from its course. It will be obvious that the greater the deviation of contact arm 25 from its mid-position, the greater will be the movement of the rudder and of the contact arm 31 in order for the system to be rebalanced.

As the aircraft gradually resumes its course due to the adjustment of the rudder just described, contact arm 25 will be moved to the right by reason of its bias. This will continually tend to induce in secondary winding 46 a voltage such as to cause the grid 53 of tube 49 to be raised above its cut-off voltage so that clutch winding 15 is energized. Each time that the voltage is sufficient to cause this action, the motor 13 will be operated to move the rudder back towards its neutral position and to move contact arm 31 back towards the center. Thus, as the aircraft gradually resumes its course, the rudder will be gradually adjusted in position until the switch blade 20 is just ready to separate from contact 21. At this point, the rudder will be displaced by a predetermined amount from its center position. As soon as the contact arm 20 separates from contact 21, the rudder will be moved back to its neutral position in the manner previously described.

It is believed that the action when the aircraft departs a substantial distance in the opposite direction to that just considered will be quite obvious. In other words, the switch blade 20 will first engage contact 22 and will then cause movement of contact arm 25 to the right. As soon as contact arm 25 has moved to the right, the bridge will be unbalanced to add to the unbalanced voltage induced by the lower half of primary winding 45. This will cause the rudder to be moved to a position dependent upon the magnitude of deviation of arm 20 from its neutral position. As the aircraft again resumes its course, the various elements will be moved back to their neutral position.

It will be noted that with the system just described, the rudder is variably positioned upon substantial deviations in direction of flight of the aircraft. While the forces required to move the various controlling elements are extremely small so that extremely accurate control of the rudder is obtained, provision is made for adjusting the rudder when the forces available are even smaller. Even when the movement of the aircraft from its course is so slight that it would be impossible to adjust the variable resistance by the force resulting from such slight deviation, the present system provides for a small predetermined adjustment of the rudder. Under normal conditions, this adjustment of the rudder is sufficiently quick as to prevent the deviation from assuming larger undesired values. Thus, under conditions of flight through relatively still air, it is possible to maintain the aircraft very accurately on its course. When, however, the flight conditions are not as satisfactory and the position of the aircraft may be changed quickly, provision is made for adjusting the rudder in proportion to the amount of deviation of the aircraft from its desired position. Thus, I obtain with my system the advantages of extreme accuracy of adjustment for very minor deviations in the direction of flight with variable adjustments for large deviations. It will be obvious that while I have described my invention in connection with a flight control system, the system of controlling the motor is applicable in other fields where it is desirable under certain cases to have small fixed movements of the motor and in other cases to have large variable movements of the motor.

While I have shown a specific embodiment of my invention, it is to be understood that this is for purposes of illustration and that my invention is to be limited only by the scope of the appended claims.

I claim as my invention:

1. In flight control mechanism for aircraft having a control surface movable with respect to said aircraft, operating means for positioning said control surface, means responsive to the attitude of said aircraft, means operatively connected to said attitude responsive means and effective upon a substantial deviation in the attitude of the aircraft to cause said operating means to be moved an amount proportional to the magnitude of said deviation, and further means operatively connected to said attitude responsive means and effective upon a slight deviation of said aircraft from the desired attitude to cause said operating means to be adjusted by a fixed amount.

2. In flight control mechanism for aircraft having a control surface movable with respect to said aircraft, operating means for positioning said control surface, means responsive to the attitude of said aircraft, means operatively connected to said attitude responsive means and effective upon a deviation in the attitude of said aircraft from the desired attitude by more than a predetermined amount to cause said operating means to be adjusted by an amount proportional to the magnitude of said deviation, and further means operatively connected to said attitude responsive means and effective upon a deviation of said attitude from the desired one by less than said predetermined amount to cause said operating means to be adjusted by a fixed amount.

3. In a flight control mechanism for aircraft having a control surface movable with respect to said aircraft, operating means for positioning said control surface, means responsive to attitude of said aircraft, means including a variable impedance operatively connected to said attitude responsive means and effective upon a substantial deviation in the attitude of the aircraft to cause said operating means to be adjusted by an amount proportional to the magnitude of said deviation, and further means including a switch operatively connected to said attitude responsive means, said further means being effective upon a slight deviation of said attitude from the desired attitude to cause said operating means to be adjusted by a fixed amount.

4. In flight control mechanism for aircraft having a control surface movable with respect to said aircraft, operating means for positioning said control surface, means responsive to the attitude of said aircraft, a first control device connected to said attitude responsive means and moved thereby upon the exertion of an appreciable force by said attitude responsive means due to a substantial deviation of the attitude of said aircraft from the desired one, a second control device connected to said condition responsive means and moved thereby upon the exertion of only a slight force by said attitude responsive means, means associated with said first control device and effective upon said device being moved to cause said operating means to be adjusted by an amount dependent upon the amount of such movement, and means associated with said second control device and effective upon said second device being moved to cause said operating means to be adjusted by a fixed amount.

5. In flight control mechanism for aircraft having a control surface movable with respect to said aircraft, operating means for positioning said control surface, means responsive to the attitude of said aircraft, a potentiometer including a movable contact connected to said attitude responsive means and moved thereby upon the exertion of an appreciable force by said attitude responsive means due to a substantial deviation of the attitude of said aircraft from the desired one, a switch including a movable switch element connected to said attitude responsive means and moved thereby upon the exertion of only a slight force by said attitude responsive means, means associated with said potentiometer and effective upon said movable contact being moved to cause said operating means to be adjusted by an amount dependent upon the amount of such movement, and means associated with said switch and effective upon said switch being moved to cause said operating means to be adjusted by a fixed amount.

6. In a motor control system, motor means, a main controller, a control device, a variable impedance, means connecting said main controller to said control device and said impedance and being effective upon continuous movement of said main controller first to move said control device to a first controlling position without affecting said variable impedance and then to adjust said variable impedance, means operative upon said control device being moved to said first position to cause said motor means to move in one manner and upon said impedance being varied to cause said motor means to assume any one of a plurality of positions dependent upon the value of said impedance.

7. In a motor control system, motor means, a main controller, a switch, a variable impedance, means connecting said main controller to said switch and said impedance and being effective upon continuous movement of said main controller first to move said switch to a first controlling position without affecting said variable impedance and then to adjust said variable impedance, means operative upon said switch being moved to said first position to cause said motor means to move in one manner and upon said impedance being varied to cause said motor means to assume any one of a plurality of positions dependent upon the value of said impedance.

8. In a motor control system, motor means, a main controller, a control device, a variable impedance, means connecting said main controller to said control device and said impedance and being effective upon continuous movement of said main controller first to move said control device to a first controlling position without affecting said variable impedance and then to adjust said variable impedance, means operative upon said control device being moved to said first position to cause said motor means to move a predetermined distance and upon said impedance being varied to cause said motor means to assume any one of a plurality of positions dependent upon the value of said impedance.

9. In a motor control system, motor means, a sensitive condition responsive main controller, a switch blade, an associated fixed contact, a variable impedance including a resistor and a contact slidable thereon, means connecting said main controller to said switch blade and to said contact and being effective upon continuous movement of said main controller first to move said switch blade into engagement with said fixed contact without moving said slidable contact and then to adjust said slidable contact with respect to said resistor, means operative upon said switch being moved into engagement with said fixed contact to cause said motor means to move in one manner and upon said impedance being varied to cause said motor means to assume any one of a plurality of positions dependent upon the value of said impedance.

10. In a motor control system, motor means, an impedance bridge comprising a controlling variable impedance and a follow-up variable impedance positioned by said motor, means responsive to the unbalance of said bridge for causing said motor means to move an amount dependent upon the amount of said unbalance, a main controlling element, lost motion connecting means for connecting said controlling variable impedance to said controlling element so that the former is adjusted by the latter, and means operated by said controlling element within the range of the lost motion movement of said connecting means to cause said motor means to move a predetermined distance.

11. In a motor control system, motor means, an impedance bridge comprising a controlling variable impedance and a follow-up variable impedance positioned by said motor, means responsive to the unbalance of said bridge for causing said motor means to move an amount dependent upon the amount of said unbalance, a condition responsive element, lost motion connecting means for connecting said controlling variable impedance to said condition responsive element so that the former is adjusted by the latter, and means operated by said condition responsive element within the range of the lost motion movement of said connecting means to cause said motor means to move a predetermined distance.

12. In a motor control system, motor means, an impedance bridge comprising a controlling variable impedance and a follow-up variable impedance positioned by said motor, motor controlling means responsive to the unbalance voltage of said bridge for causing said motor means to move an amount dependent upon the amount of said unbalance, a main controlling element, means for connecting said controlling variable impedance to said controlling element so that the former is adjusted by the latter, and means including a switch operated by said controlling element within a narrow portion of the range of movement thereof for applying to said motor controlling means a voltage equal to the voltage resulting from a predetermined unbalance of said bridge.

13. In a motor control system, motor means, an impedance bridge comprising a controlling variable impedance and a follow-up variable impedance positioned by said motor, motor controlling means responsive to the unbalance voltage of said bridge for causing said motor means to move an amount dependent upon the amount of said unbalance, a main controlling element, lost motion connecting means for connecting said controlling variable impedance to said controlling element so that the former is adjusted by the latter, and means operated by said controlling element within the range of the lost motion movement of said connecting means to apply to said motor controlling means a voltage equal to the voltage resulting from a predetermined unbalance of said bridge.

14. In a motor control system, electric motor means, an electronic amplifier for controlling the energization of said motor means, a transformer having a secondary winding and two primary windings, an input circuit for said electronic amplifier including said secondary winding, a variable impedance network controlling the energization of one of said primary windings, and auxiliary controlling means for controlling the other of said primary windings.

15. In a motor control system, electric motor means, an electronic amplifier for controlling the energization of said motor means, a transformer having a secondary winding and two primary windings, an input circuit for said electronic amplifier including said secondary winding, an impedance network controlling the energization of one of said primary windings, said impedance network comprising a variable impedance varied in accordance with the value of a controlling condition, and condition responsive controlling means operable without affecting said variable impedance for controlling the other of said primary windings.

16. In a motor control system, electric motor means, an electronic amplier for controlling the energization of said motor means, a transformer having a secondary winding and two primary windings, an input circuit for said electronic amplifier including said secondary winding, an impedance network controlling the energization of one of said primary windings, and switching means for controlling the other of said primary windings.

17. In a motor control system, electric motor means, an electronic amplifier for controlling the energization of said motor means, a transformer having a secondary winding and two primary windings, an input circuit for said electronic amplifier including said secondary winding, a normally balanced impedance network connected to one of said primary windings and effective to apply to said primary winding a voltage varying in phase and magnitude with the direction and extent of unbalance, and means for applying to the other of said primary windings a voltage varying in direction and magnitude with the direction and extent of deviation of a controlling condtion from a desired value.

18. In a motor control system, motor means, motor controlling means, a transformer comprising a secondary winding and two primary windings, connections between said secondary winding and said motor controlling means, a variable impedance bridge controlling the energization of one of said primary windings, said bridge including a controlling impedance and a main controller for varying said controlling impedance, and means operated by said main controller independently of said controlling impedance for controlling the energization of the other primary winding.

19. In a motor control system, motor means, motor controlling means, a transformer comprising a secondary winding and two primary windings, connections between said secondary winding and said motor controlling means, a variable impedance bridge controlling the energization of one of said primary windings, said bridge including a controlling impedance and a main controller connected to said controlling impedance through a lost motion connection so that said controlling impedance is adjusted by said main controller when the latter is moved beyond the range of said lost motion, and means operated by said main controller within the range of said lost motion for controlling the energization of the other primary winding independently of said controlling impedance.

20. In a motor control system, motor means, motor controlling means, a transformer comprising a secondary winding and two primary windings, connections between said secondary winding and said motor controlling means, a variable impedance bridge controlling the energization of one of said primary windings, said bridge including a controlling impedance and a main controller for varying said impedance means, and means operated by said main controller independently of said controlling impedance for controlling the energization of the other primary winding.

SIEGFRIED G. ISSERSTEDT.